March 3, 1959     L. F. ARGENTIN     2,876,333
RESISTANCE WELDING METHODS AND APPARATUS
Filed March 27, 1957
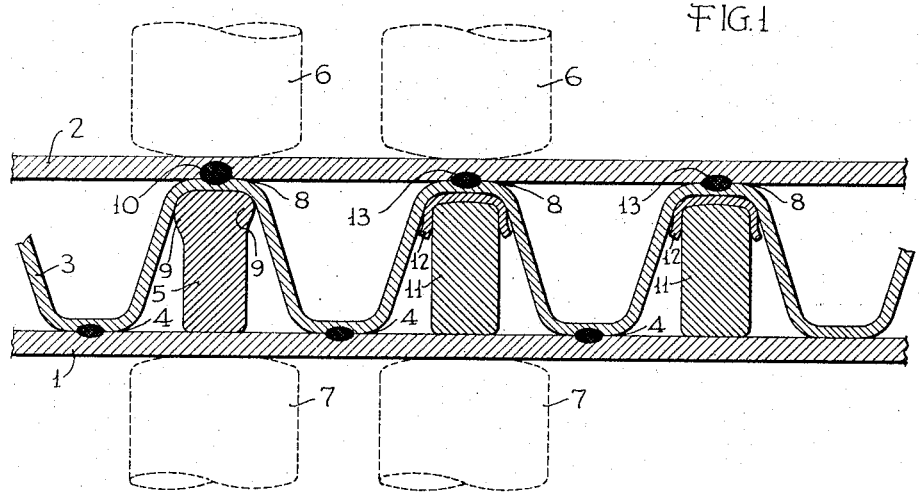
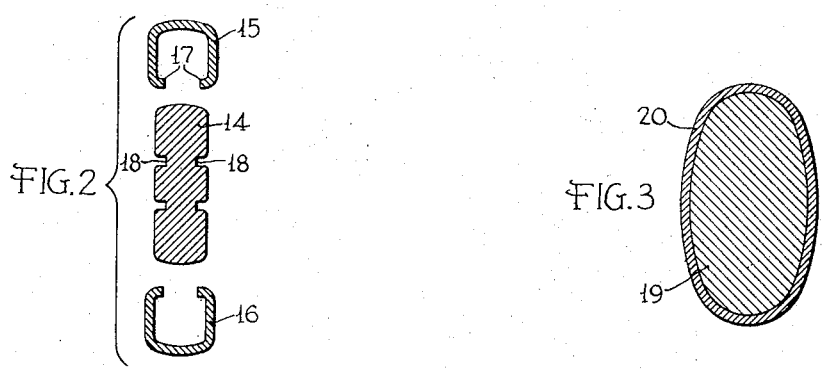
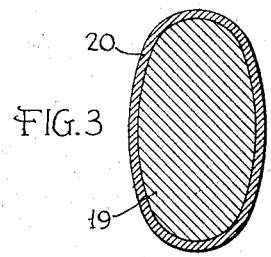
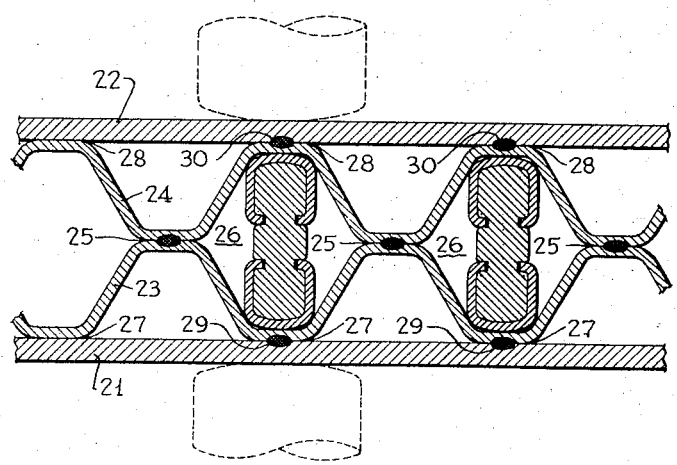
INVENTOR
Lou F. Argentin
BY
ATTORNEY

# United States Patent Office 2,876,333
Patented Mar. 3, 1959

2,876,333

RESISTANCE WELDING METHODS AND APPARATUS

Lou F. Argentin, Doylestown, Pa., assignor to The Budd Company, Philadelphia, Pa., a corporation of Pennsylvania Application March 27, 1957, Serial No. 648,911

9 Claims. (Cl. 219—91)

This invention pertains to resistance welding methods and apparatus and more particularly to the resistance welding fabrication of sandwich structures for airfoil members and the like and to an improved mandrel assembly therefor.

In many applications where structures are required having high strength to weight characteristics it has been desirable to employ sheetmetal sandwich structures. For example, airfoil structures are made as a sandwich of stainless steel sheetmetal skins welded to opposite sides of a corrugated core of the same material. Such a sandwich, for a given unit weight, has much improved structural characteristics relative to a single thicker sheet of the same material or of a lighter material. The improvement is most apparent in applications where the structures are subject to high ambient temperatures.

Sandwich structure fabrication requires mandrel assemblies to concentrate welding pressure and current at weld points inaccessible to welding electrodes. Because of the necessity for high electrical conductivity, the mandrels are usually made of relatively ductile copper and consequently are prone to deformation during the welding operation. Distorted mandrels are difficult to remove from the completed structure and reworking or replacement of the mandrels after each use contributes greatly to the cost of sandwich fabrication. Further, since high thermal conductivity is concomitant with high electrical conductivity, it is extremely difficult to achieve a sufficient weld nugget penetration into relatively thin core sheets, without distortion of the skin surface.

Accordingly, it is an object of this invention to provide an improved method whereby sheetmetal sandwich structures may be fabricated efficiently and inexpensively.

A further object is to provide a sandwich fabrication method employing mandrels which assures satisfactory weld nugget development without distortion of the structure or of the mandrels.

Another object of this invention is to provide an improved mandrel assembly for the resistance welding of sandwich structures.

Still another object is to provide an improved mandrel assembly which is not expended by normal usage and which assures production of satisfactory welds.

According to this invention resistance welding at positions inaccessible from the exterior of a sandwich structure is accomplished by interposing a layer of a metal having conductivity characteristics similar to those of the metals to be welded between a mandrel bar and the welding position. An illustrated embodiment of a mandrel assembly according to this invention comprises a bar of a metal having high electrical conductivity and a hood of the same or similar material as that of the structure to be welded covering the mandrel surface presented to the welding position. The hood may be an integral or separable part of the mandrel assembly.

The subject matter of this invention is particularly pointed out and distinctly claimed in the concluding portion of this specification. The invention, however, both as to organization and method of operation, together with further objects and advantages thereof, may best be understood by reference to the following description taken in connection with the accompanying drawing in which:

Fig. 1 is a sectional view of a sheetmetal sandwich structure constructed in accordance with this invention;

Figs. 2 and 3 illustrate preferred embodiments of a mandrel assembly; and

Fig. 4 is a sectional view of a type of sandwich structure having a composite core.

Cross-section views are shown in the drawing for simplicity. It is understood, however, that cross-sections repeated in a direction perpendicular to the plane of the sheet are similar and of uniform dimension.

Referring now to Figure 1, a sheetmetal sandwich of the type having application as an airfol member for high speed aircraft may comprise planar skins 1 and 2 and corrugated sheetmetal core member 3. Preferably the skins and core are of stainless steel. Thicknesses, exaggerated in the illustration, are in the range of several thousandths of an inch with the core material thickness being generally less than one-half that of the skins.

The first skin 1 may be welded to the core 2 along faying surfaces 4 according to conventional seam or spot welding techniques. For application of the second skin 2, however, the interior side of the welding position is inaccessible to a welding electrode. Therefore, a mandrel 5 must be used to concentrate the welding pressure and current between upper and lower welding electrodes 6 and 7, at the weld points along the faying surfaces 8.

Since the mandrel must conduct the high-amperage welding current, the choice of materials therefor is limited to copper and copper alloys which are relatively ductile. Mushrooming distortion as at 9 of such a unitary mandrel is unavoidable under the heat and concentrated pressure at the weld point. The conventional mandrels also contribute to asymmetrical weld nugget development as at 10 between a thick skin 2 and a thin core component 3. Heat developed at the faying surface 8 is dissipated faster along the shorter path through the core material to the mandrel than along the longer path to electrode 6. Because of this asymmetrical conduction a compromise has been forced between a weld nugget size large enough for sufficient penetration of the core and yet small enough to avoid penetration or distortion of the skin. Distortion of the skin also accompanies mushrooming of the mandrel as evidenced by a pinched effect or indentation of the sandwich at the weld positions. This is due to the dimensional instability of the conventional mandrel under the pressure and heat developed during welding.

The method according to this invention assures symmetrical weld nugget formation without distortion of the skins or of the mandrel dimensions. Conventional steps to weld the skin 1 to core 2 are first completed. Thereafter, a mandrel bar 11 of copper or the like, and a mandrel hood 12 of a material similar to that of the sandwich are inserted as a composite mandrel assembly at the weld position. The hood thickness preferably is such as to balance the heat loss in both directions from the faying surface and the hood area is such as to cover completely the surface of bar 11 presented to the welding position. The attachment of skin 2 to core 3 may then be accomplished by spot or seam welding without distortion of the sandwich or of the mandrel assembly.

The hood 12 distributes the welding pressure conducted to the welding position through the mandrel assembly over a large area of the bar 11 alleviating distortion thereof and a more nearly symmetrical weld nugget 13 results since heat loss from the weld to the mandrel is attenuated by the relatively low conductivity of the material of the hood. This latter effect further reduces mandrel distortion because satisfactory weld penetration is achieved with reduced current and pressure inputs. Dimensional stability for the sandwich structure is improved directly with the improved dimensional stability of the mandrel assembly.

Figure 2 illustrates a preferred embodiment of a mandrel assembly according to this invention. The assembly comprises mandrel bar 14 preferably of copper and mandrel hoods 15 and 16. Each hood is shaped to cover a surface of the bar presented to a welding position. In applications where there are welding positions on one side only of the assembly a single hood is employed. Each hood may be generally channel shaped and provided with inturned attachment portions 17. The bar is provided with a pair of opposed grooves 18 of a shape complementary to that of the hood attachment portions 17. The hood is attached to the bar by engaging the portions 17 within the grooves 18.

An additional embodiment for the mandrel assembly is shown in Figure 3 and comprises a bar 19 and an enveloping hood 20. The hood may be attached by sweating upon a preformed bar or, alternatively, the mandrel assembly may be accomplished by casting the copper bar in the hood, the latter serving as a mold for the material of the bar.

Figure 4 illustrates a specific type of sandwich structure requiring welding along opposite faces of a mandrel assembly. The structure is formed from planar skins 21 and 22 and a composite sheetmetal core comprising mirror-image halves 23 and 24. The core is first assembled by conventional seam welding along faying surfaces 25 between the core halves. Skins 21 and 22 are then set in place, aligned, and tack welded or otherwise temporarily held in position. Mandrel assemblies 26 are inserted in the voids formed between the halves of the core. The mandrel assembly chosen should provide hoods underlying each of the faying surfaces 27 and 28. Welds as at 29 and 30 may then be formed simultaneously with conventional welding equipment.

In the assembly shown the skin sheets are .014" thick and the core sheets .006" thick, each of stainless steel. The hood thickness is chosen to attenuate heat loss from the weld point sufficiently to allow substantially symmetrical weld nugget development. Such attenuation must be insufficient, however, to allow weld nugget development along faying surfaces between the hood and the sandwich components and, therefore, the hood thickness should preferably be not greater than one-half of the core material thickness, .003" for the stainless steel hood of this example.

While there have been described what are present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A mandrel assembly for the resistance welding of transversely separated pairs of stainless steel sandwich structure components, said mandrel assembly comprising an elongated copper bar having opposed welding position surfaces and indented side portions defining pairs of opposed longitudinal grooves therein and a detachable pair of stainless steel hoods in contact with said surfaces each having inturned attachment portions engaged in a pair of said grooves, the thickness of said hood being not greater than one-half the minimum thickness of said components and the transverse dimension of said assembly being equal to the transverse separation of said pairs of components whereby symmetrical weld nugget bonds may be formed simultaneously between the components of each of said pairs with substantially no distortion of said assembly and of said structure.

2. A method of resistance welding fabrication of stainless steel sandwich structures comprising a pair of sheetmetal skins and a composite corrugate sheet metal core, which method comprises the steps of welding the core components together, positioning the skins on opposite sides of the composite core, inserting a copper mandrel bar within a void formed between the core components, inserting between the bar and the core components stainless steel mandrel hoods of a thickness not greater than the minimum thickness of the sandwich structure components, simultaneously welding the skins to the core, and removing the mandrel bar and hoods.

3. A mandrel assembly for the resistance welding of sheetmetal sandwich structure components separated transversely from an adjacent component of the structure, said mandrel assembly comprising a copper bar and a stainless steel hood in contact with the surface of said bar to be presented to the components to be welded, the thickness of said hood being not greater than the minimum thickness of the structure components to be welded, the transverse dimension of said assembly being equal to the transverse separation between the components to be welded and the adjacent component of the structure.

4. A method of resistance welding fabrication of stainless steel sandwich structures of the type composed of sheetmetal skin and core components, which method comprises the steps of welding together a core component and an adjacent component along first faying surfaces therebetween, positioning an additional component in contact with the core component along second faying surfaces, inserting a copper mandrel bar within a void formed between the core component and the adjacent component, inserting a stainless steel mandrel hood between the mandrel bar and the second faying surfaces, welding along the second faying surfaces, and removing the mandrel bar and hood.

5. A mandrel assembly for resistance welding fabrication of sheetmetal sandwich structure components separated transversely from an adjacent component of the structure, said mandrel assembly comprising a bar and a hood in contact with the surface of said bar to be presented to the components to be welded, said bar being of a material having higher electrical conductivity than the components to be welded, said hood being of a material having thermal conductivity similar to that of the components to be welded, the transverse dimensions of said assembly being equal to the transverse separation between the components to be welded and the adjacent component of the structure.

6. A method of resistance welding fabrication of sandwich structures comprising a pair of sheetmetal skins, and a composite sheetmetal core, which method comprises the steps of welding the core components together, positioning the skins on opposite sides of the composite core, inserting a mandrel of high conductivity material within a void formed between the core components, inserting mandrel hoods of low conductivity material between the mandrel bar and the core components, simultaneously welding the skins to the core, and removing the mandrel bar and hood.

7. A method of resistance welding fabrication of sandwich structures of the type composed of sheetmetal skin and core components, which method comprises the steps of welding together a core component and an adjacent component along first faying surfaces therebetween, positioning an additional component in contact with the core component along second faying surfaces, inserting a mandrel bar of high conductivity material within a void formed between the core component and the adjacent component, inserting a mandrel hood of a low conductivity material between the mandrel bar and the second faying surfaces, welding along the second faying surfaces, and removing the mandrel bar and hood.

8. A method of resistance welding attachment of a third component of a sheetmetal sandwich structure to a second component at a welding position spaced apart from a first component pre-assembled with the second component, which method comprises the steps of positioning the third component in contact with the second component, inserting a mandrel bar of higher conductivity material than that of the components along the interior of the welding position, interposing a mandrel hood of lower conductivity material than that of the mandrel between the mandrel bar and the welding position, and passing a welding current through the third component, the second component, the mandrel hood, the mandrel bar, and the first component in series.

9. A mandrel assembly for the resistance welding of sheetmetal sandwich structure components at interior welding positions, which assembly comprises a mandrel bar having a substantially greater thermal conductivity than that of the material of the components to be welded and a mandrel hood in contact with the surface of said bar to be presented to the welding position, the thickness of said hood being less than the minimum thickness of the components to be welded and the material of said hood having a thermal conductivity substantially equal to that of the components to be welded.

References Cited in the file of this patent

UNITED STATES PATENTS

| | | |
|---|---|---|
| 2,056,563 | Budd et al. | Oct. 6, 1936 |
| 2,324,435 | Smith | July 13, 1943 |